(12) United States Patent
Lyle et al.

(10) Patent No.: US 7,694,097 B2
(45) Date of Patent: Apr. 6, 2010

(54) SYSTEM AND METHOD FOR MANAGING AN ELECTRONIC STORAGE VOLUME

(75) Inventors: Ruthie D. Lyle, Durham, NC (US); Fonda Daniels, Cary, NC (US); Andrew L. Schirmer, Andover, MA (US)

(73) Assignee: International Business Machines Corporation, Armonk, NY (US)

( * ) Notice: Subject to any disclaimer, the term of this patent is extended or adjusted under 35 U.S.C. 154(b) by 752 days.

(21) Appl. No.: 10/988,730

(22) Filed: Nov. 15, 2004

(65) Prior Publication Data
US 2006/0107018 A1 May 18, 2006

(51) Int. Cl.
G06F 12/00 (2006.01)
G06F 13/00 (2006.01)
(52) U.S. Cl. ...................... 711/165; 711/170
(58) Field of Classification Search .................. 711/156
See application file for complete search history.

(56) References Cited

U.S. PATENT DOCUMENTS

| 5,765,170 | A | 6/1998 | Morikawa |
| 5,864,684 | A | 1/1999 | Nielsen |
| 6,052,709 | A | 4/2000 | Paul |
| 6,101,329 | A * | 8/2000 | Graef ........................ 710/52 |
| 6,301,608 | B1 | 10/2001 | Rochkind |
| 6,324,569 | B1 | 11/2001 | Ogilvie et al. |
| 6,453,327 | B1 | 9/2002 | Nielsen |
| 6,609,138 | B1 | 8/2003 | Merriam |
| 6,615,241 | B1 | 9/2003 | Miller et al. |
| 6,643,686 | B1 | 11/2003 | Hall |
| 6,747,658 | B2 | 6/2004 | Doyle et al. |
| 6,748,422 | B2 | 6/2004 | Morin et al. |
| 7,028,158 | B1 * | 4/2006 | Beatty et al. ................ 711/202 |
| 2003/0191909 | A1 * | 10/2003 | Asano et al. ................ 711/154 |

OTHER PUBLICATIONS

Hon, W.K.; "Spam Solution?"; Computers and Law; vol. 13, No. 2, pp. 9-11; Jun.-Jul. 2002; UK Publication.

* cited by examiner

*Primary Examiner*—Pierre-Michel Bataille
*Assistant Examiner*—Hamdy S Ahmed
(74) *Attorney, Agent, or Firm*—Guerin & Rodriguez, LLP

(57) ABSTRACT

A system and method for managing an electronic storage volume is described. The method includes assigning a threshold to a constrained storage space to define a first state in which an amount of data stored in the constrained storage space exceeds the threshold and a second state in which the amount of data stored in the confined storage space does not exceed the threshold. The method also includes comparing the amount of data to be stored in the constrained storage space and the threshold, and performing a predefined action if the comparison indicates that the amount data to be in the confined storage space would cause a transition between the first state and the second state.

7 Claims, 4 Drawing Sheets

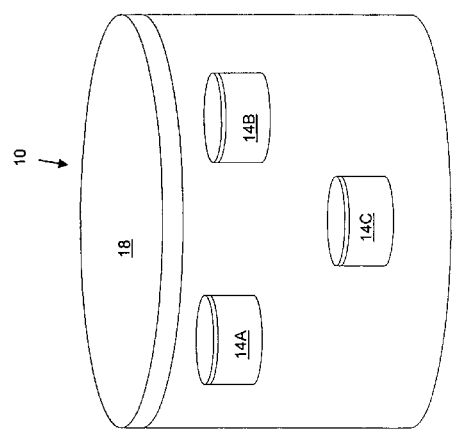
FIG. 1
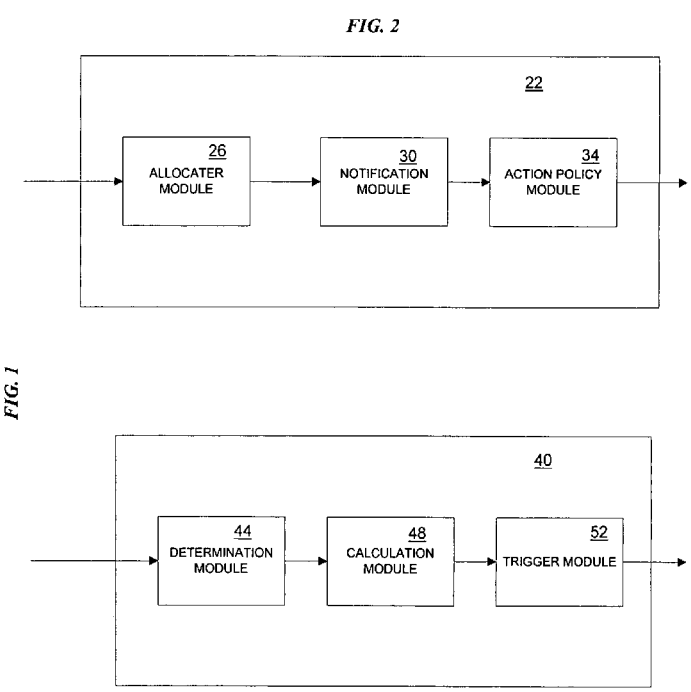
FIG. 2
FIG. 4

| | FOLDER | ALLOCATED CAPACITY | THRESHOLD | NOTIFY | ACTION POLICY | CURRENT USED | CAPACITY REMAINING |
|---|---|---|---|---|---|---|---|
| 14A | In-Box | NA | NA | N | U | 30,000,000 | 20% (10,000,000) |
| 14B | Sent | NA | NA | N | D | 10,000,000 | 20% (10,000,000) |
| 14C | Spam | 5% (5,000,00) | None | N | D | 5,000,000 | 0% (0,000,000) |
| 14D | Shopping | 25% (25,000,000) | 75% (18,750,000) | Y | U | 19,000,000 | 24% (6,000,000) |
| 14E | Banking | 20% (20,000,00) | 75% (15,000,000) | Y | U | 10,000,000 | 50% (10,000,000) |

*FIG. 6*

SYSTEM AND METHOD FOR MANAGING AN ELECTRONIC STORAGE VOLUME

FIELD OF THE INVENTION

The invention relates to an electronic storage volume. More specifically, the invention relates to managing the electronic storage volume by constraining a size of sub-volumes within the electronic storage volume.

BACKGROUND OF THE INVENTION

In general, a storage volume (e.g., a hard disk, server storage, flash ROM, and the like) has an overall fixed storage capacity. The overall fixed storage capacity is divided into various partitions (e.g., folders) that store data according to predetermined criteria or as directed by a user. As additional data is added to the various partitions, the size of the partitions increase accordingly. The additional storage space added to the partitions reduces the unused amount of overall storage capacity. This can create problems for a user who wishes to limit the amount of data stored in a folder or to maintain a certain amount of available storage space.

SUMMARY OF THE INVENTION

In general, the invention is directed to managing a storage volume by providing means to create constrained sub-volumes from the capacity of the storage volume and assign predetermined action policies to the sub-volumes that are executed when certain criteria are met.

In one aspect, the invention features a method of managing a storage volume having a fixed size and a constrained storage space having a dynamically reconfigurable storage capacity within the storage volume. The method includes assigning a threshold to a constrained storage space to define a first state in which an amount of data stored in the constrained storage space exceeds the threshold and a second state in which the amount of data stored in the confined storage space does not exceed the threshold. The method also includes comparing the amount of data to be stored in the constrained storage space and the threshold, and performing a predefined action if the comparison indicates that the amount data to be in the confined storage space would cause a transition between the first state and the second state.

BRIEF DESCRIPTION OF THE DRAWINGS

The above and further advantages of this invention may be better understood by referring to the following description in conjunction with the accompanying drawings, in which like numerals indicate like structural elements and features in various figures. The drawings are not necessarily to scale, emphasis instead being placed upon illustrating the principles of the invention.

FIG. 1 is a graphical representation of a storage volume having sub-volumes.

FIG. 2 is a block diagram of an embodiment of a configuration software module according to principles of the invention.

FIG. 4 is a block diagram of an embodiment of a processing software module according to principles of the invention.

FIG. 6 is a graphical representation showing an example of management of a storage volume according to principles of the present invention.

DETAILED DESCRIPTION

Figure 3:
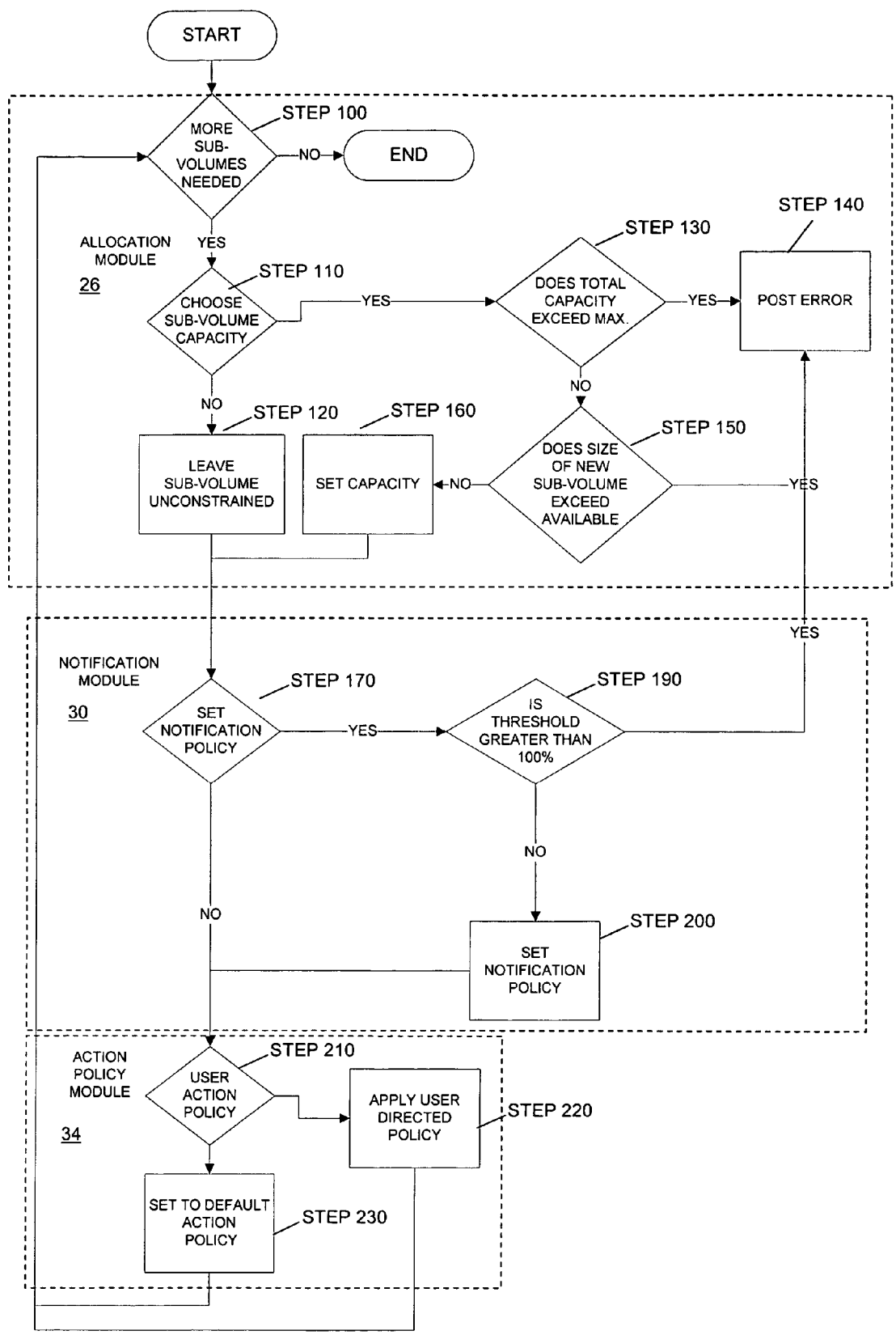
FIG. 3 is a flow chart depicting an embodiment of the operation of the configuration software module of FIG. 2.

The present invention relates to software configured to manage a storage volume. The management software includes a configuration software module and a processing software module. The configuration software module enables a user to generate constrained and unconstrained sub-volumes for storing data. Examples of data include, but are not limited to, documents, emails, image files, presentations, and other data files. The processing module analyzes an amount of data to be stored in the sub-volumes and executes predetermined action policies if certain criteria are met with respect to the sub-volumes.

FIG. 1 shows a fixed storage volume 10 having an overall storage capacity (e.g., 100 megabytes). Within the fixed storage volume 10 are a number of sub-volumes 14A, 14B, 14C (only three are shown for clarity) that have a storage capacity (e.g., 5 megabytes each) that is a portion of the overall capacity of the fixed storage volume 10. Any portion of the fixed storage volume 10 that is not designated as a sub-volume 14 is referred to as unallocated capacity 18. Examples of the fixed size storage volume 10 can include, but are not limited to, a hard disk, a removable disk, a server, a flash memory device, a network storage device, and any other device capability of storing data. As used herein, sub-volume refers to a defined portion of the fixed volume. Examples of a sub-volume 14 can include, but are not limited to a folder, a partition, and the like. Each sub-volume 14 can also have additional sub-volumes 14 therein that divide the storage capacity of sub-volume 14. Said another way, each sub-volume 14 can have nested sub-volumes 14.

During operation, each sub-volume 14 stores data according to the preferences of the user. Additionally, the unallocated capacity 18 can store data. The size of each sub-volume 14 is either constrained by the user in accordance with the principles of the invention or left unconstrained. As used herein, constrained refers to the state having a not-to-exceed size for the sub-volume 14. It should be understood, that the not-to-exceed size of the constrained sub-volume 14 can be dynamically reconfigured as part of the normal operation of the software of the present invention. For example, a sub-volume 14 can be originally configured to have a not-to-exceed size of 5 megabytes. However, during operation the user can dynamically reconfigure the not-to-exceed size to a larger value.

FIG. 2 depicts a configuration software module 22 constructed according to principles of the invention. The configuration software module includes an allocater module 26, a notification module 30, and an action policy module 34. The allocater module 26 provides for the creation of sub-volumes 14 and allocates the not-to-exceed size of the sub-volumes 14. The notification module 30 allows the user to assign a notification policy to each sub-volume 14. The action policy module 34 allows the user to assign a predefined action policy or a default action policy to each sub-volume 14.

FIG. 3 shows a flow chart depicting an embodiment of the operation of the configuration software module 22. The user determines (step 100) whether to create a sub-volume 14 within the fixed storage volume 10. The not-to-exceed size of the sub-volume 14 is either declared (step 110) to limit the capacity of the sub-volume 14 or the sub-volume 14 is configured (step 120) as an unconstrained sub-volume. As used herein, unconstrained sub-volume refers to a sub-volume 14 that does not have an associated not-to-exceed size. As additional data is added to the unconstrained sub-volume, the capacity of the unconstrained sub-volume is increased accordingly.

Once the not-to-exceed size of the sub-volume 14 is declared, the allocater module 26 determines (step 130) whether the total capacity of any existing constrained sub-volumes, unconstrained sub-volumes, and the newly created sub-volume 14 and the unallocated capacity of the of the fixed storage volume 10 exceeds the capacity of the fixed storage volume 10. If so, an error message is displayed (step 140) to the user that states that the size of total capacity of the fixed storage volume 10 is exceeded. Also, the allocater module 26 determines (step 150) whether the not-to-exceed size exceeds the remaining unallocated capacity of fixed storage volume 10. When the not-to-exceed size exceeds the remaining unallocated capacity of fixed storage volume 10, an error message is displayed (step 140) to the user that states that the not-to-exceed size exceeds the size of the remaining unallocated capacity of fixed storage volume 10. If creation of the new sub-volume 14 does not result in an error, the not-to-exceed size is applied to the sub-volume 14 to create constrained storage volume having a fixed capacity that is equal to the not-to-exceed size.

After creating the sub-volume 14, the user decides (step 170) whether to apply a notification policy to the sub-volume 14 using the notification module 30. If a notification policy is not desired, then a notification policy is not applied and the process continues to step 210. To apply a notification policy to the sub-volume 14, a threshold (or trigger) is communicated to the notification module 30. The threshold is analyzed (step 190) to determine if the threshold exceeds the capacity of the sub-volume 14. An error is displayed (step 140) to the user if the threshold exceeds the capacity of the sub-volume 14, otherwise, the threshold is applied (step 200) to the sub-volume 14. The threshold defines two states for the sub-volume. In the first state, the amount of data stored in the sub-volume 14 does not exceed the threshold, and in the second state the amount of data stored in the sub-volume 14 exceeds the threshold. Adding new data to the sub-volume 14 or removing data from the sub-volume 14 can cause a transition between the states of the sub-volume 14. If a state transition occurs, a notification policy assigned to the sub-volume 14 is executed.

The action policy module 34 allows the user to define a predetermined action policy and associate the action policy with the sub-volume 14. In general, an action policy is a set of commands that perform a specific function to provide a desired result. For example, deleting data until a certain amount of unused capacity is reached. As used herein, a default predetermined action policy refers to an action policy that does not request permission from the user before executing or is assigned by an entity other than the user (e.g., a system administrator). A user defined predetermined action policy allows the user to configure the commands to produce the desired result. The user predefined action policy can operate by requesting permission from the user or the user predefined action policy can operate automatically if configured to do so. The user determines (step 210) whether to apply a default predetermined action policy (step 220) or a user directed predetermined action policy (step 230).

FIG. 4 shows a block diagram of an embodiment of a processing software module 40 constructed according to principles of the invention. The processing software module 40 includes a determination module 44, a calculation module 48, and a triggering module 52. The determination module 44 is configured for analyzing a sub-volume 14 prior to storing new data therein. Functionality provided by the calculation module 48 includes, but is not limited to, determining whether adding data to the sub-volume 14 exceeds the capacity of the sub-volume 14 and whether adding data to the sub-volume 14 exceeds the threshold, if a threshold is associated with the sub-volume 14. The triggering module 52 provides functionality such as executing the predetermined action policy of the sub-volume 14, notifying the user of the execution of the predetermined action policy, notifying the user of the determination made by the calculation module, and receiving user input responsive to the notification.

Figure 5:
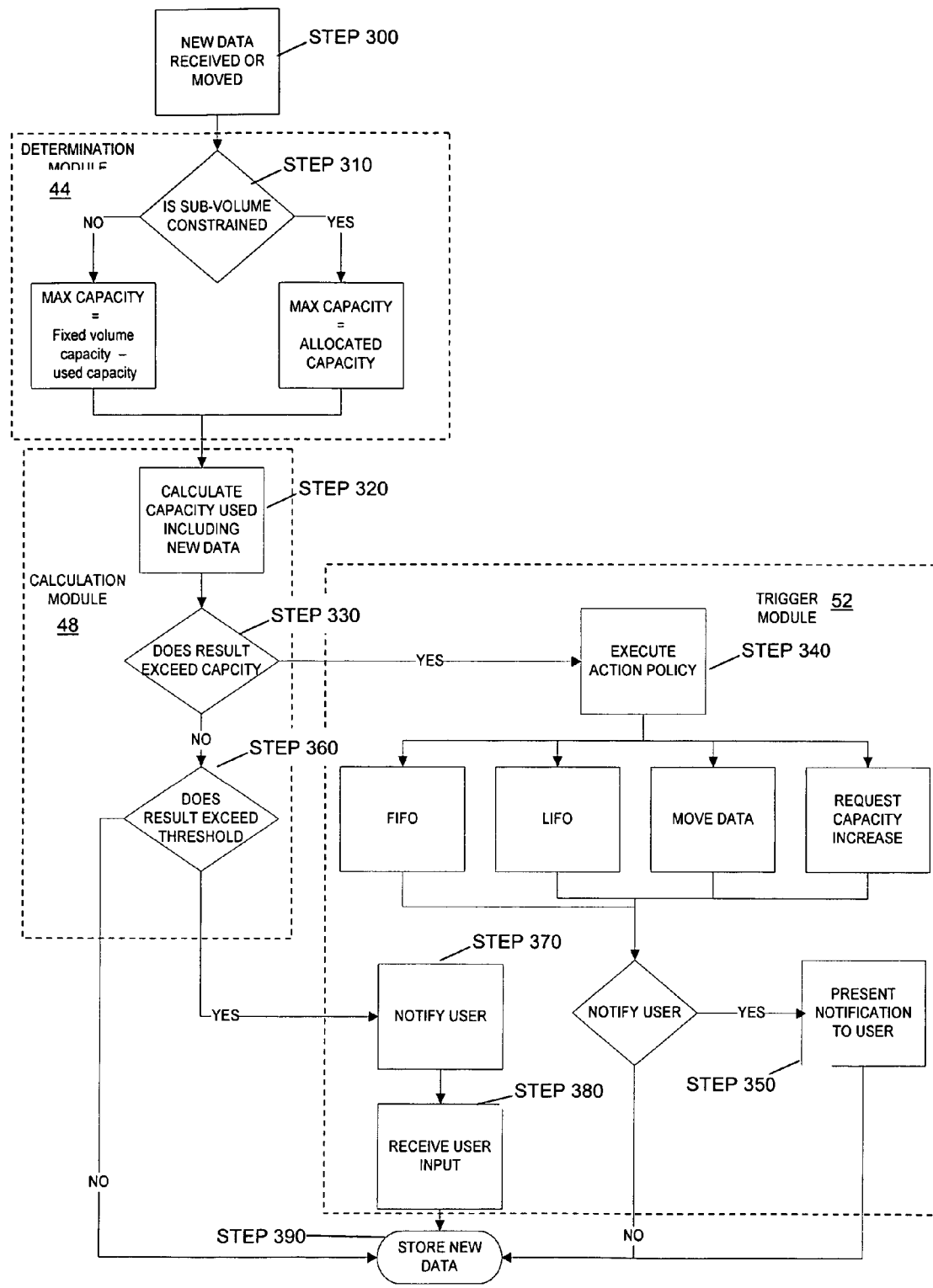
FIG. 5 is a flow chart depicting an embodiment of the operation of the processing software module of FIG. 4

FIG. 5 shows a flow chart depicting an embodiment of the operation of the processing software module 40. Initially, the user receives (step 300) new data to store in a sub-volume 14 or begins to transfer existing data into the sub-volume 14 from another storage location. The determination module 44 analyzes (step 310) the sub-volume 14 to determine whether it is constrained or unconstrained, and to determine its capacity. If the sub-volume 14 is constrained, then the capacity of the sub-volume 14 equals the allocated capacity as configured by the configuration software module 22. If the sub-volume is unconstrained, the capacity equals the capacity of the fixed storage volume 10 less the capacity that is storing existing data.

The calculation module 48 calculates (step 320) a total amount of data that will be stored in the sub-volume 14 by adding the amount of the new data to the amount of any preexisting data stored in the sub-volume 14. The calculation module then compares (step 330) the total amount of data to the capacity of the sub-volume 14. If the total amount of data exceeds the capacity of the sub-volume 14, the triggering module 52 executes (step 340) the predetermined action policy associated with sub-volume 14.

One example of a predetermined action policy is deleting data from the sub-volume 14 to generate additional capacity to store the new data on a first-in, first out (FIFO) basis. That is, the oldest preexisting data of the sub-volume 14 is deleted first. Another example of a predetermined action policy is deleting data from the sub-volume 14 on a last-in, first-out (LIFO) basis. That is, the most recent preexisting data of the sub-volume 14 is deleted from the sub-volume first. Another predetermined action policy can be moving preexisting data from the sub-volume 14 to another sub-volume 14. This can be done on either a FIFO or LIFO basis. In another example, a predetermined action policy dynamically reconfigures the capacity of the sub-volume 14. As used herein, dynamic reconfiguration refers to increasing or decreasing the capacity of the sub-volume 14 in real-time. The triggering module may notify (step 350) the user after executing the predetermined action policy.

If the calculation module 48 ascertains (step 330) that the total amount of data does not exceed the capacity of the sub-volume 14, the calculation module 52 then compares (step 360) the total amount of data to the threshold of the sub-volume 14 otherwise the new data is stored in the sub-volume 14. If the total amount of data exceeds the threshold, the user receives (step 370) notification. In response, the user inputs (step 380) a desired action (e.g., acknowledging the threshold will be exceeded) through a graphical user interface (not shown). After execution of the triggering module, the new data is stored (step 390) in the sub-volume 14.

Example

The following description provides one example application of principles of the present invention and is not intended to limit the invention. One use for the present invention is with electronic mail systems, such as HOTMAIL®, YAHOO MAIL®, and the like. HOTMAIL provides a user with a fixed size storage volume 10 having an overall capacity of 100 megabytes. The user creates folders (i.e., sub-volumes 14) that store emails according to subjects as directed by the user.

With reference to FIG. 6, the user is assigned an in-box folder 14A and a sent folder 14B by the electronic mail system. Using the configuration software module 22, the user creates a spam folder 14C and allocates 5% of the overall capacity of the spam folder 14C. As a result the capacity of the spam folder 14C is constrained to a size of 5 megabytes. Prior to setting the capacity of the spam folder 14C, the allocater module 26 checks the requested allocation size of the spam folder 14C to ensure that the requested capacity does not exceed the overall capacity allowed by the electronic mail system. Also, the allocater 26 module ensures that the requested capacity does not exceed the available capacity (i.e., the capacity that is not currently storing data or assigned to other constrained sub-volumes 14).

Next, the user interacts with the notification module 30 and chooses not to assign a threshold to the spam folder 14C. As a result, the user will not be notified when the spam folder 14C reaches capacity. Using the action policy module 34, the user chooses not to define an action policy for the spam folder 14C. As a result, a default action policy D is assigned to the spam folder 14C. In this example, the default action policy D is to delete an email from the respective folder 14 on a FIFO basis. As shown, the spam folder 14C is currently at capacity and therefore any additional received spam email will result in the deletion of the first received spam email presently in the spam folder 14.

Next, using the configuration software module 22, the user creates a shopping folder 14D to store electronic messages related to the user's shopping activities. For this folder 14D, the user allocates 25% of the 100 megabytes (i.e., 25 megabytes), assigns a threshold of 75% (i.e., 18.75 megabytes), and associates a user defined action policy U. In this example, the user defined action policy U requests an increase in capacity for the shopping folder 14D. As shown, the amount of email stored in the shopping folder 14D exceeds the assigned threshold (i.e., presently 19 megabytes of email are stored in the shopping folder 14D). A request for an increase in the capacity of the shopping folder 14D may be presented to the user for acceptance or processed automatically without requesting action by the user.

The user also creates a banking folder 14E for storing email related to the user's banking activities. The user allocates 20% of the 100 megabytes (i.e., 20 megabytes) as capacity of the banking folder 14E, assigns a threshold of 75% (i.e., 15 megabytes), and associates a user defined action policy U. In this example, the user defined action policy U moves the first received email in the folder to another location (e.g., a network storage device or forwards the email to another account for archiving). As shown, 10 megabytes of email stored in the banking folder 14E does not exceed the threshold. If a new email related to banking is received and has a size greater than 5 megabytes, the user is presented with a notification that the threshold will be exceeded and that an existing email will be moved to another location when the new email is stored in the banking folder 14D.

While the invention has been shown and described with reference to specific preferred embodiments, it should be understood by those skilled in the art that various changes in form and detail may be made therein without departing from the spirit and scope of the invention as defined by the following claims. Although described as a method and data file the invention can be embodied as instructions on a computer readable medium (e.g., compact disk, DVD, flash memory, and the like) that is sold and distributed in various commercial channels. Also, the instructions contained on the computer readable medium can be downloaded across a network (e.g., Internet). Additionally, the invention can be embodied as a computer data signal embodied in a carrier wave for managing a storage volume.

What is claimed is:

1. A method of managing a constrained storage space within a storage volume having a fixed size and a plurality of users, the method comprising:

assigning, for each of the users, a user-specific threshold to the constrained storage space to define for the user an amount of data that is less than a dynamically reconfigurable storage capacity of the constrained storage space, the dynamically reconfigurable storage capacity being less than the fixed size of the storage volume;

comparing, for each of the users, an amount of data to be stored in the constrained storage space and the respective user-specific threshold; and performing, for each of the users, a user-specific action predefined by the user and executed when the respective comparison indicates that the amount of data to be stored in the constrained storage space would cause a transition of the respective user-specific threshold, the user-specific action being different from a default action to be performed for each of the users in the absence of a respective user-specific action, the user-specific action for one of the users comprising deleting preexisting data in the constrained storage space and the user-specific action for another one of the users comprising changing a size of the constrained storage space.

2. The method of claim 1 further comprising allocating the storage capacity of the constrained storage space.

3. The method of claim 1 wherein performing a user-specific action for one of the users comprises removing data from the constrained storage space.

4. The method of claim 1 wherein performing a user-specific action for one of the users comprises providing a notification to the user that the amount of data to be stored in the constrained storage space exceeds the threshold.

5. The method of claim 1 further comprising allocating a portion of the storage volume to define at least one additional constrained storage space having a dynamically reconfigurable storage capacity within the storage volume.

6. The method of claim 1 wherein preexisting data in the constrained storage space we deleted according to a first-in-first-out basis.

7. The method of claim 1 wherein preexisting data in the constrained storage space are deleted according to a last-in-last-out basis.

* * * * *